(12) United States Patent
Miao

(10) Patent No.: US 10,672,195 B2
(45) Date of Patent: Jun. 2, 2020

(54) INFORMATION PROCESSING METHOD AND INFORMATION PROCESSING DEVICE

(71) Applicant: FUJITSU LIMITED, Kawasaki-shi, Kanagawa (JP)

(72) Inventor: Qianwen Miao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/989,727

(22) Filed: May 25, 2018

(65) Prior Publication Data

US 2018/0342110 A1 Nov. 29, 2018

(30) Foreign Application Priority Data

May 27, 2017 (CN) .......................... 2017 1 0390426

(51) Int. Cl.
*G06T 19/20* (2011.01)
*G06T 17/10* (2006.01)
*G06T 7/80* (2017.01)
*G06K 9/00* (2006.01)
*G06T 7/149* (2017.01)

(52) U.S. Cl.
CPC .......... *G06T 19/20* (2013.01); *G06K 9/00208* (2013.01); *G06K 9/00268* (2013.01); *G06K 9/00302* (2013.01); *G06K 9/00362* (2013.01); *G06T 7/149* (2017.01); *G06T 7/85* (2017.01); *G06T 17/10* (2013.01); *G06T 2207/10004* (2013.01); *G06T 2207/30201* (2013.01); *G06T 2219/2016* (2013.01); *G06T 2219/2021* (2013.01)

(58) Field of Classification Search
CPC ............ G06T 19/20; G06T 7/85; G06T 17/10

USPC ......................................................... 345/420
See application file for complete search history.

(56) References Cited

U.S. PATENT DOCUMENTS

| | | | | |
|---|---|---|---|---|
| 2010/0134487 A1* | 6/2010 | Lai | ...................... | G06K 9/00268 345/419 |
| 2010/0215255 A1* | 8/2010 | Xiao | .................... | G06K 9/00281 382/159 |
| 2012/0237117 A1* | 9/2012 | Liu | ..................... | G06K 9/00228 382/159 |
| 2012/0321134 A1* | 12/2012 | Shen | .................. | G06K 9/00208 382/103 |
| 2015/0084950 A1* | 3/2015 | Li | ....................... | G06K 9/00214 345/419 |

(Continued)

OTHER PUBLICATIONS

Yue Wu, et al., "Robust Facial Landmark Detection under Significant Head Poses and Occlusion", provided by the Computer Vision Foundation, pp. 3658-3666.

*Primary Examiner* — Jin Ge
(74) *Attorney, Agent, or Firm* — Staas & Halsey LLP

(57) ABSTRACT

An information processing method and an information processing device are disclosed. The information processing method comprises: calculating at least one of a shape parameter and an expression parameter based on a correspondence relationship between a first set of fin a two-dimensional image containing a face of a person and a second set of landmarks in an average three-dimensional face model; and configuring a face deformable model using the at least one of the shape parameter and the expression parameter, to obtain a specific three-dimensional model corresponding to the face contained in the two-dimensional image.

7 Claims, 6 Drawing Sheets

(56) References Cited

U.S. PATENT DOCUMENTS

| | | | |
|---|---|---|---|
| 2015/0235372 A1* | 8/2015 | Smolyanskiy | G06T 7/0071 |
| | | | 345/420 |
| 2016/0070952 A1* | 3/2016 | Kim | G06K 9/00208 |
| | | | 382/118 |
| 2016/0148425 A1* | 5/2016 | Hwang | G06K 9/00281 |
| | | | 345/419 |
| 2016/0217318 A1* | 7/2016 | Hayasaka | G06T 3/60 |
| 2016/0379041 A1* | 12/2016 | Rhee | G06K 9/00208 |
| | | | 382/118 |
| 2017/0069124 A1* | 3/2017 | Tong | G06T 13/40 |
| 2017/0154461 A1* | 6/2017 | Rhee | G06T 15/04 |

\* cited by examiner

Figure 2

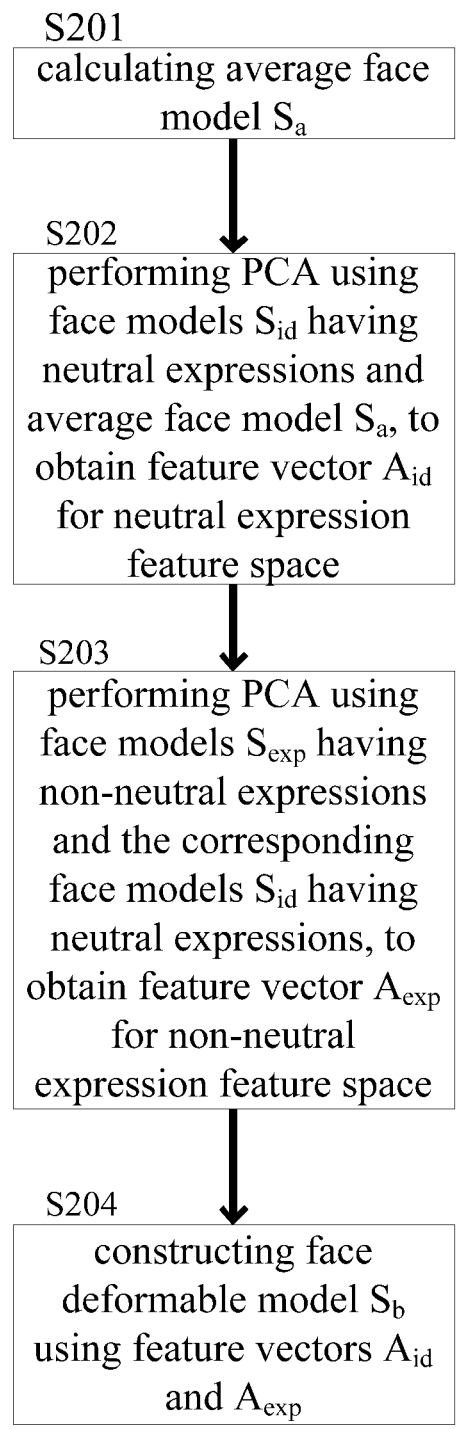

S201 calculating average face model $S_a$

S202 performing PCA using face models $S_{id}$ having neutral expressions and average face model $S_a$, to obtain feature vector $A_{id}$ for neutral expression feature space S203 performing PCA using face models $S_{exp}$ having non-neutral expressions and the corresponding face models $S_{id}$ having neutral expressions, to obtain feature vector $A_{exp}$ for non-neutral expression feature space S204 constructing face deformable model $S_b$ using feature vectors $A_{id}$ and $A_{exp}$

INFORMATION PROCESSING METHOD AND INFORMATION PROCESSING DEVICE

CROSS REFERENCE TO RELATED APPLICATION

This application is based on and claims priority under 35 U.S.C. § 119 to Chinese Patent Application No. 201710390426.6 filed on May 27, 2017, in the Chinese State Intellectual Property Office and entitled "Information Processing Method and Information Processing Device", the disclosure of which is incorporated herein by reference in its entirety.

FIELD

The present disclosure relates to an information processing technology, and in particular to a method and a device for processing face images.

BACKGROUND

Currently, face image processing technology such as face recognition and face image enhancement has been developed greatly. A face in an image is related to not only appearance of a person, but also other factors such as expression and posture of the person. Therefore, extraction of expression or posture of the face from the face image is very helpful in the face image enhancement.

Therefore, it is desired to provide a face image processing technology using the expression or posture of the person.

SUMMARY

An information processing method is provided according to an aspect of the present disclosure, which comprises: calculating at least one of a shape parameter and an expression parameter based on a correspondence relationship between a first set of features in a two-dimensional (2D) image containing a face of a person and a second set of features in an average three-dimensional (3D) face model; and configuring a face deformable model using the at least one of the shape parameter and the expression parameter, to obtain a specific 3D model corresponding to the face contained in the 2D image.

An information processing method is provided according to another aspect of the present disclosure, which comprises: calculating an average face model and a shape feature based on multiple first face models having neural expressions; calculating an expression feature based on differences between the multiple first face models and multiple second face models having non-neural expressions; and constructing a face deformable model using the average face model, the shape feature and the expression feature.

An information processing device is provided according to another aspect of the present disclosure. The information processing device comprises a processing circuitry configured to implement the above information processing method.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The present disclosure may be better understood with reference to the description given in conjunction with the drawings hereinafter. The same or similar components are denoted with the same or similar reference signs throughout the drawings. The drawings, together with the detailed description below, are incorporated in the specification and form a part of the specification, for further illustrating preferred embodiments of the present disclosure and explaining the principle and advantages of the present disclosure. In the drawings:

FIG. 2 is a flowchart of the process of obtaining the face deformable model;

DETAILED DESCRIPTION

Figure 1:
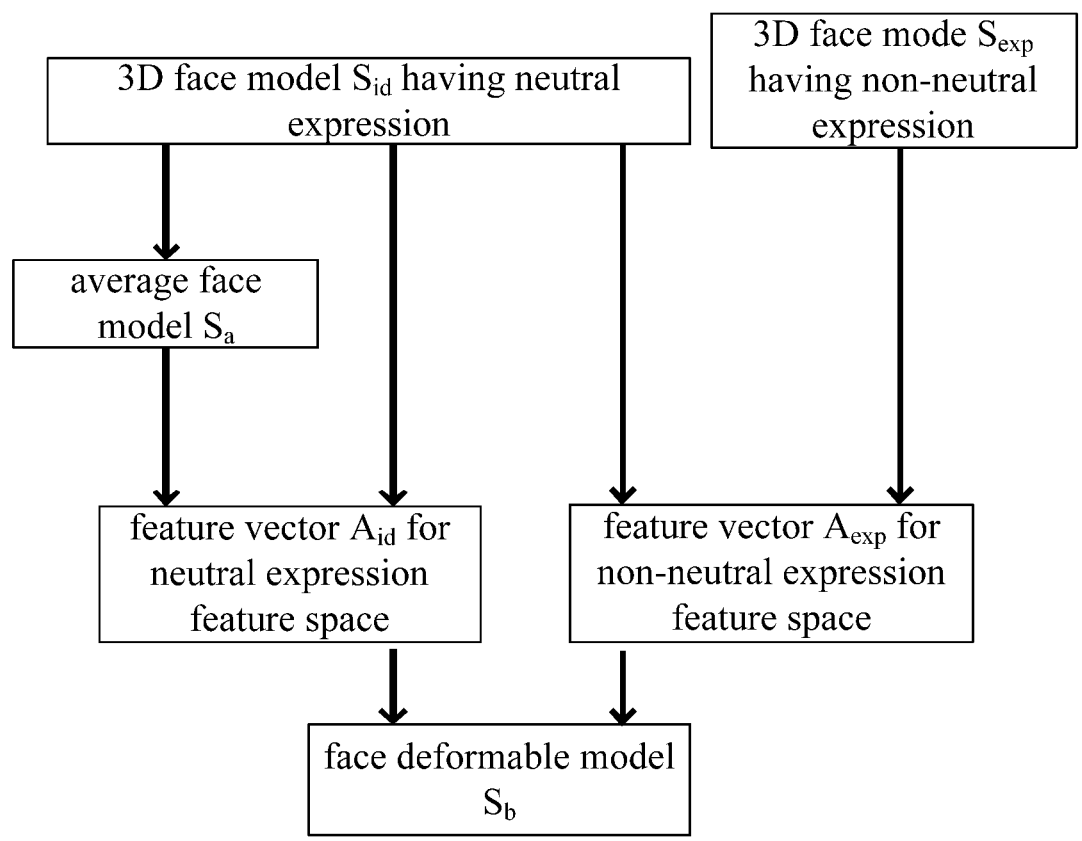
FIG. 1 is a schematic diagram showing a process of obtaining a face deformable model.

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 1 schematically shows a process of obtaining a face deformable model. It is assumed that multiple three-dimensional (3D) face models are pre-stored in a database, including multiple 3D face models $S_{id}$ having neutral expressions and multiple 3D face models $S_{exp}$ having non-neutral expressions. The non-neutral expression includes any expression other than the neutral expression. In addition, any one of the 3D face models $S_{exp}$ having non-neutral expressions corresponds to one of the 3D models $S_{id}$ having neutral expressions. Here, the phrase "correspond to" indicates that the 3D face model $S_{exp}$ having non-neutral expression and the 3D face model $S_{id}$ having neutral expression are 3D models of the same face except for different expressions.

In the process of obtaining a face deformable model, an average face model $S_a$ is first calculated based on the multiple 3D face models $S_{id}$ having neutral expressions stored in the database. A feature vector $A_{id}$ for neutral expression feature space is obtained by using the calculated average face model $S_a$ and the multiple 3D face models $S_{id}$ having neutral expressions. The feature vector $A_{id}$ for the neutral expression feature space corresponds to the 3D face model having neutral expression.

In addition, a feature vector $A_{exp}$ for non-neutral expression feature space is obtained based on the multiple 3D models $S_{id}$ having neutral expressions and the multiple 3D models $S_{exp}$ having non-neutral expressions stored in the database. The feature vector $A_{exp}$ for the non-neutral expression feature space corresponds to the 3D face model having non-neutral expression.

Then the face deformable model may be constructed using the obtained feature vectors $A_{id}$ and $A_{exp}$. The face deformable model is a base model. Various 3D face models may be obtained by adjusting the face deformable model. A flow of a process of obtaining the face deformable model is described in detail below in conjunction with FIG. 2.

As shown in FIG. 2, in operation S201, an average face model $S_a$ is calculated based on the multiple 3D models $S_{id}$ having neutral expressions stored in the database (also referred to as "sample set") according to the following equation (1).

$$S_a = \sum_{i=1}^{m} \alpha_i S_{id,i} \qquad (1)$$

where $S_{id,i}$ denotes the i-th 3D model $S_{id}$ having neutral expression, that is, the i-th sample, i=1, 2, . . . , m, and $\alpha_i$ denotes weight coefficient for the i-th 3D model having neutral expression. For example, $\alpha_i$ may be set as $$\frac{1}{m}.$$

In operation S202, the feature vector $A_{id}$ for neutral expression feature space is calculated using principal component analysis (PCA) based on the multiple 3D models $S_{id}$ having neutral expressions and the calculated average face model $S_a$. The principle of the PCA is that, a high-dimensional vector is projected into a low-dimensional vector space through a feature vector matrix, and expressed as a low-dimensional vector, while only some secondary information is lost. That is, the original high-dimensional vector may be substantially reconstructed based on the low-dimensional vector and the feature vector matrix. In face image processing, the feature vector matrix may be referred to as feature space.

As described above, the average face model $S_a$ is obtained according to equation (1). Next, a covariance matrix for the sample set is calculated according to the following equation (2).

$$\sum = \frac{1}{m} \sum_{i=1}^{m} (S_{id,i} - S_a)(S_{id,i} - S_a)^T \qquad (2)$$

Then feature vectors and the corresponding feature values for the covariance matrix are calculated. A feature vector matrix composed of these feature vectors is orthogonal basis for the face space, and any 3D model having neutral expression in the sample set may be reconstructed based on a linear combination of these feature vectors.

Then the calculated feature values are ranked in a descending order. The feature vectors corresponding to a predetermined number of top-ranked feature values constitute principal components, and the principal components constitute a reduced-dimension feature subspace. As such, any face image (high-dimensional vector) may be projected into the feature subspace to obtain low-dimensional vector. The principal component obtained in this way is the feature vector $A_{id}$ for the neutral expression feature space.

Similarly, in operation S203, the feature vector $A_{exp}$ for non-neutral expression feature space may be calculated using the PCA based on the 3D model $S_{exp}$ having non-neutral expression and the corresponding 3D model $S_{id}$ having neutral expression.

In operation S204, a face deformable model $S_b$ may be constructed using the calculated feature vectors $A_{id}$ and $A_{exp}$ according to the following equation (3).

$$S_b = S_a + A_{id} + A_{exp} \qquad (3)$$

The face deformable model $S_b$ is a base model. A 3D face model corresponding to a specific face may be generated by applying unique features of the specific face to the face deformable model $S_b$, for example, by weighting the feature vectors $A_{id}$ and $A_{exp}$ in equation (3) using the features of the specific face.

Figure 3:
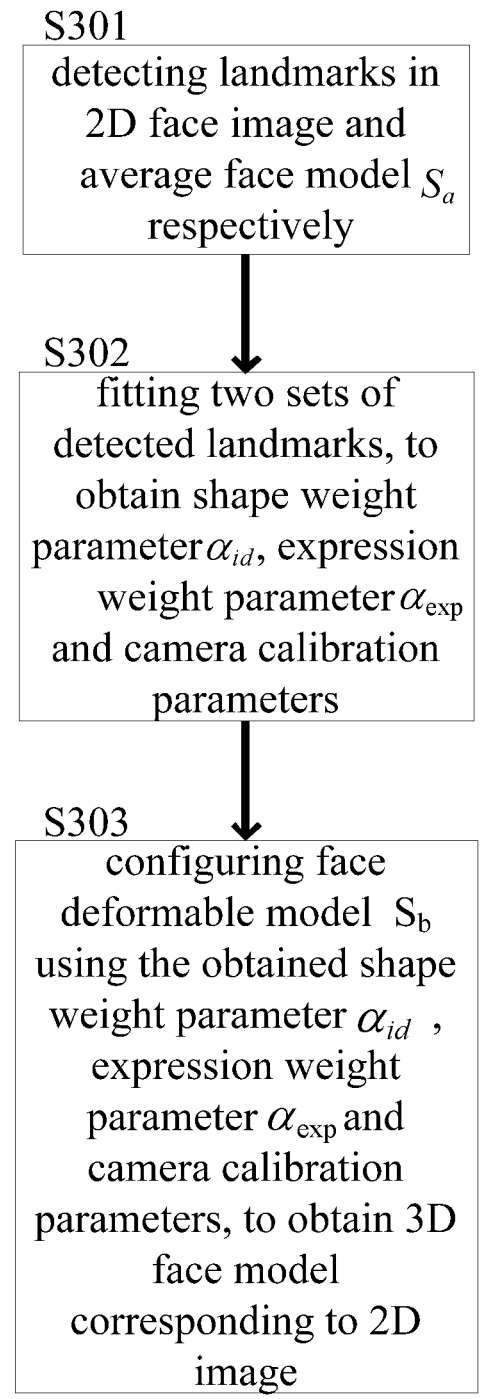
FIG. 3 is a flowchart of a process of constructing a 3D face model based on a 2D face image.

A process of constructing a 3D face model based on a 2D face image will be described below in conjunction with FIG. 3. As shown in FIG. 3, in operation S301, on the basis of a set of detection positions on the face, a set of landmarks (features or characteristics) are detected in the 2D face image and a set of landmarks are detected in the average face model $S_a$ obtained above. The detection of landmarks on the face may be implemented using multiple technologies known to those skilled in the art, which is not limited herein. While landmark or landmarks as discussed herein, the detection according to the present disclosure may be of any feature, characteristic, etc., in an image which may be a fixed point, line or other identifier on a face of a person that may be factored into information processing to determine an expression, posture, trait and/or other identifying data.

In operation S302, the two sets of detected landmarks are fitted. For example, shape weight parameter $\alpha_{id}$, expression weight parameter $\alpha_{exp}$ and camera calibration parameters are calculated based on the correspondence relationship between the two sets of landmarks in a manner that a distance between each landmark in the first set of landmarks and the corresponding landmark in the second set of landmarks is minimized, as shown in equation (4). Herein, "corresponding landmarks" indicate two landmarks detected respectively in the 2D face image and the average face model $S_a$ with respect to the same detection position on the face (for example, the left eye and the nose).

$$\underset{f,R,t,\alpha_{id},\alpha_{exp}}{\operatorname{argmin}} \|P_{2Dt} - P_{2D}\| \qquad (4)$$

In equation (4), t denotes conversion vector, f and R denote camera calibration parameters, $P_{2D}$ denotes the landmark detected in the 2D face image, $P_{2Dt}$ denotes the landmark which corresponds to $P_{2D}$ and is on a 2D image obtained by mapping the average face model Sa into a 2D space after applying the camera calibration parameters thereto.

The camera calibration parameters include scaling coefficient f and rotation matrix $R(\alpha,\beta,\gamma)$. The scaling coefficient f is used for adjusting the size of the 3D face model, and $\alpha,\beta,\gamma$ represent a pitch angle, a yaw angle and a roll angle of the 3D face model respectively. Therefore, the camera calibration parameters may define a scaling ratio and a posture of the 3D face model, such that the reconstructed 3D face model matches with the face in the 2D image in size and posture.

The shape weight parameter $\alpha_{id}$ and the expression weight parameter $\alpha_{exp}$ calculated according to equation (4) represent unique features of the face in the 2D image with respect to the average face model. The unique features include a unique appearance feature ($\alpha_{id}$) and a unique expression feature ($\alpha_{exp}$).

In operation S303, the face deformable model $S_b$ obtained by the process shown in FIG. 2 is configured using the calculated shape weight parameter $a_{id}$ and expression weight parameter $\alpha_{exp}$. Specifically, the feature vector Aid for the neutral expression feature space and the feature vector Aexp for the non-neutral expression feature space are respectively weighted by the shape weight parameter $\alpha_{id}$ and the expression weight parameter $\alpha_{exp}$, so as to obtain a 3D model S corresponding to the face in the 2D image, which is expressed as the following equation (5).

$$S = S_a A_{id} \alpha_{id} + A_{exp} \alpha_{exp} \quad (5)$$

The obtained 3D model S has the same appearance and expression as the face in the 2D image. In this case, the camera calibration parameters obtained in operation S302 may be further applied to the constructed 3D model S, such that the 3D model matches with the face in the 2D image not only in appearance and expression but also in size and posture.

It should be noted that, it is also possible to adjust the scaling ratio and the posture of the face deformable model $S_b$ using the camera calibration parameters, and then configure the camera-calibrated face deformable model $S_b$ using the shape weight parameter $\alpha_{id}$ and the expression weight parameter $\alpha_{exp}$. A result of such process is the same as that of operation S303.

In this way, the 3D face model corresponding to the face is reconstructed based on the 2D image containing the face.

Figure 4:
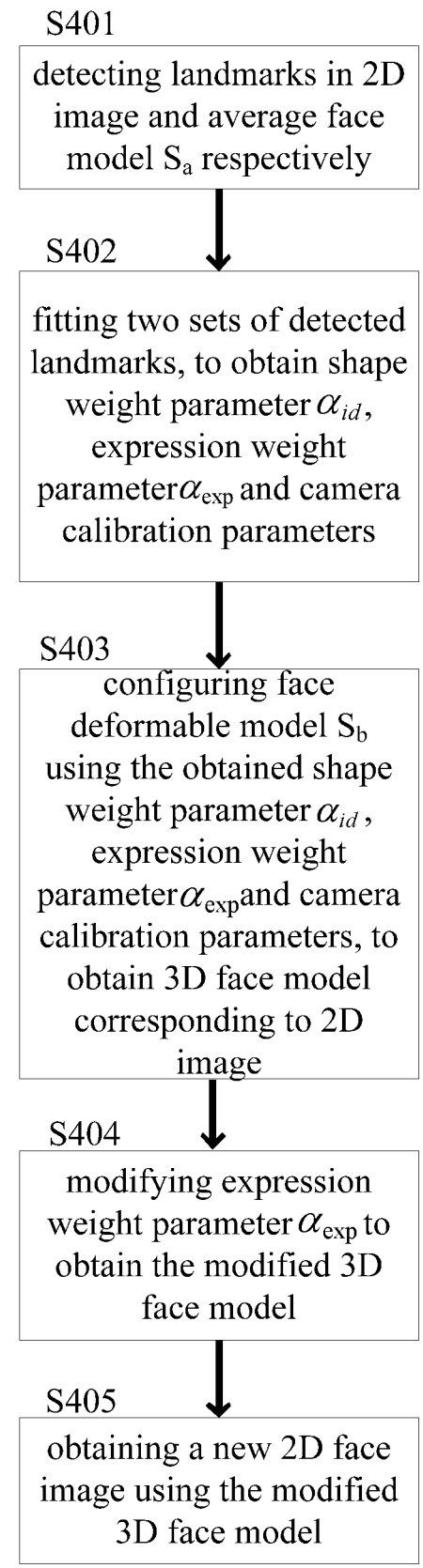
FIG. 4 is a flowchart of an example of enhancing the 2D face image using the 3D face model.

FIG. 4 shows an example of enhancing (extending) a 2D face image by using a 3D face model. As shown in FIG. 4, in operation S401, landmarks are detected respectively in a 2D image containing a specific face and an average face model Sa based on a set of detection positions. In operation S402, the two sets of detected landmarks are fitted to calculate a shape weight parameter $\alpha_{id}$, an expression weight parameter $\alpha_{exp}$ and camera calibration parameters. In operation S403, a feature vector Aid for neutral expression feature space and a feature vector Aexp for non-neutral expression feature space are respectively weighted by the obtained shape weight parameter $\alpha_{id}$ and expression weight parameter $\alpha_{exp}$, and the camera calibration parameters are applied to adjust the scaling ratio and the posture, so as to obtain a 3D model S corresponding to the face in the 2D image. Operations S401 to S403 are the same as operations S301 to S303 in FIG. 3, and thus the description thereof are omitted here.

In operation S404, the expression weight parameter $\alpha_{exp}$ is modified, and a face deformable model $S_b$ is configured using the modified expression weight parameter, so as to obtain the modified 3D face model which has the same appearance of the face but a different expression from the original expression.

When the modified expression weight parameter is denotes as $\alpha'_{exp}$, the modified 3D face model S' may be expressed as the following equation (6).

$$S' = S_a + A_{id} \alpha_{id} + A_{exp} \alpha'_{exp} \quad (6)$$

In particular, the expression weight parameter $\alpha_{exp}$ may be modified based on an expression feature extracted from a 2D image for another person, so that the modified 3D face model S' has the expression of the other person. That is, the 3D face model may be driven by the expression of the other person.

In operation S405, the modified 3D model S' is mapped into a 2D image to obtain a new 2D face image. The face contained in the new 2D image has a different expression from the expression of the person contained in the original 2D image. The process of obtaining the new 2D face image $I_{2D}$ by using the modified 3D model S' may be expressed as the following equation (7).

$$I_{2D} = fPR(\alpha,\beta,\gamma)(S'+t) \quad (7)$$

where P denotes projection matrix, and t denotes conversion vector. It should be noted that, the mapping of the 3D face model into the 2D image may be implemented by any processing method known to those skilled in the art, which is not limited herein.

As described above, in the example, more face images having different expressions may be generated by constructing the 3D model based on the original 2D face image, thereby extending the original face image.

Figure 5:
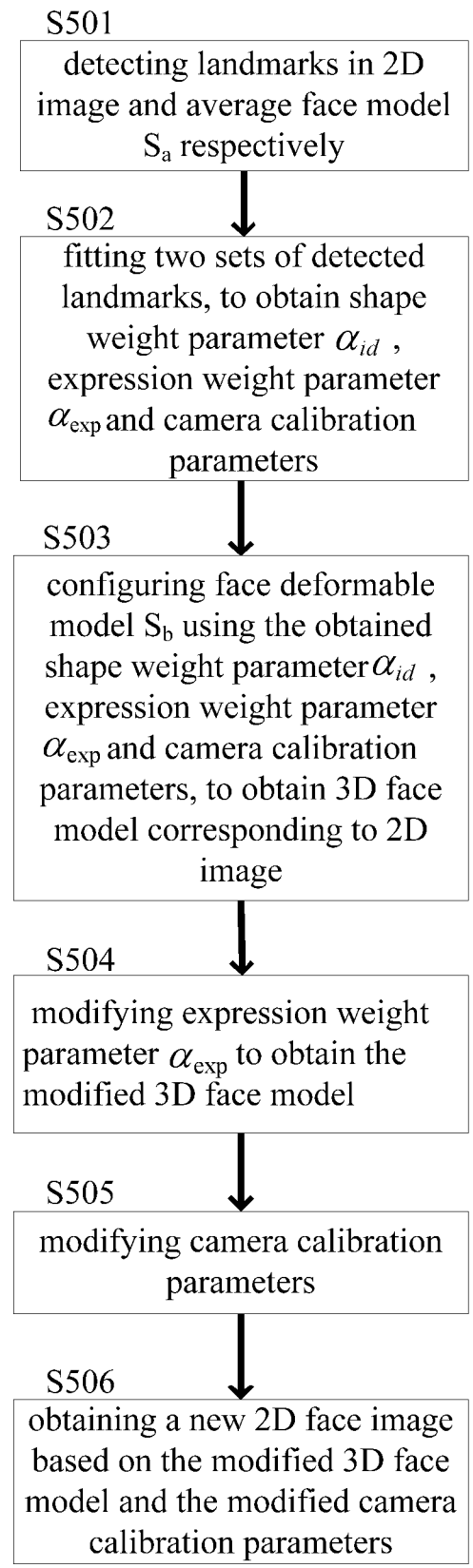
FIG. 5 is a flowchart of another example of enhancing the 2D face image using the 3D face model.

Another example of enhancing (extending) a 2D face image by using a 3D face model will be described below in conjunction with FIG. 5. As shown in FIG. 5, in operation S501, landmarks are detected respectively in a 2D image containing a specific face and the average face model $S_a$ obtained above, based on a set of detection positions. In operation S502, the two sets of detected landmarks are fitted to obtain a shape weight parameter $\alpha_{id}$, an expression weight parameter $\alpha_{exp}$ and camera calibration parameters. In operation S503, a 3D model corresponding to the face in the 2D image is constructed using the obtained shape weight parameter $\alpha_{id}$ and expression weight parameter $\alpha_{exp}$ according to the above equation (5). It should be noted that, the 3D face model constructed in operation S503 may be a 3D model which has been camera-calibrated. Operations S501 to S503 are the same as operations S301 to S303 in FIG. 3, and thus the description thereof are omitted here.

In operation S504, the expression weight parameter $\alpha_{exp}$ is modified to obtain the modified 3D face model S' having a new expression, according to the above equation (6).

Next, in operation S505, the camera calibration parameters may be further modified. For example, one or both of the scaling coefficient and the rotation matrix may be modified. As to the rotation matrix, for example, one or more of the pitch angle, the yaw angle and the roll angle $(\alpha,\beta,\gamma)$ may be modified. In the following, the modified scaling coefficient is denoted as f' and the modified rotation matrix is denoted as $R'(\alpha,\beta,\gamma)$.

In operation S506, the modified 3D face model S' is configured by applying the modified camera calibration parameters, and then the 3D model is mapped into a 2D image. The resulted 2D image $I_{2D}$ is expressed as the following equation (8).

$$I_{2D} = f'PR'(\alpha,\beta,\gamma)(S'+t) \quad (8)$$

where P denotes projection matrix, and t denotes conversion vector. The 2D face image $I_{2D}$ generated according to equation (8) may have different expression, size and posture from the face contained in the original 2D image.

It should be noted that, although the expression weight parameter and the camera calibration parameters are sequentially modified in operations S504 and S505 in FIG. 5, the two operations may be performed in a different order from that shown in FIG. 5. For example, the camera calibration parameters may be modified before modifying the expression weight parameter. In addition, operation S504 is optional in the example. That is, the operation of modifying the expression weight parameter may be omitted. In this case, the generated new 2D face image only has different size or posture from the person in the original 2D image.

As described above, in the example, the 2D image having different size, posture or expression is generated by constructing the 3D face model, thereby extending the original 2D face image.

the present disclosure provides a solution of constructing a 3D face model based on a 2D face image, and a solution of generating a 2D face image having a new expression and/or posture by using the constructed 3D model in order to enhance (extend) the original 2D image. After initial setup, the solution of the present disclosure may be performed automatically without any manual operation. Therefore, the present disclosure may be applied to a scenario where a great number of face images are desired to be generated automatically. For example, the present disclosure may automatically generate a great number of training images having different expressions and postures for training of convolutional neural network (CNN), and the trained CNN may have strong robustness against a change in expression and posture of a face.

The various processes described in the embodiments described above may be implemented with software, hardware or a combination thereof. Programs in the software may be pre-stored in a storage medium provided inside or outside a device. As an example, during execution, the programs are written in a random-access memory (RAM) and executed by a processor (such as CPU), to implement the method and process described in the above embodiments. The present disclosure includes program codes and a program product, as well as a computer readable storage medium on which the program codes are recorded.

Figure 6:
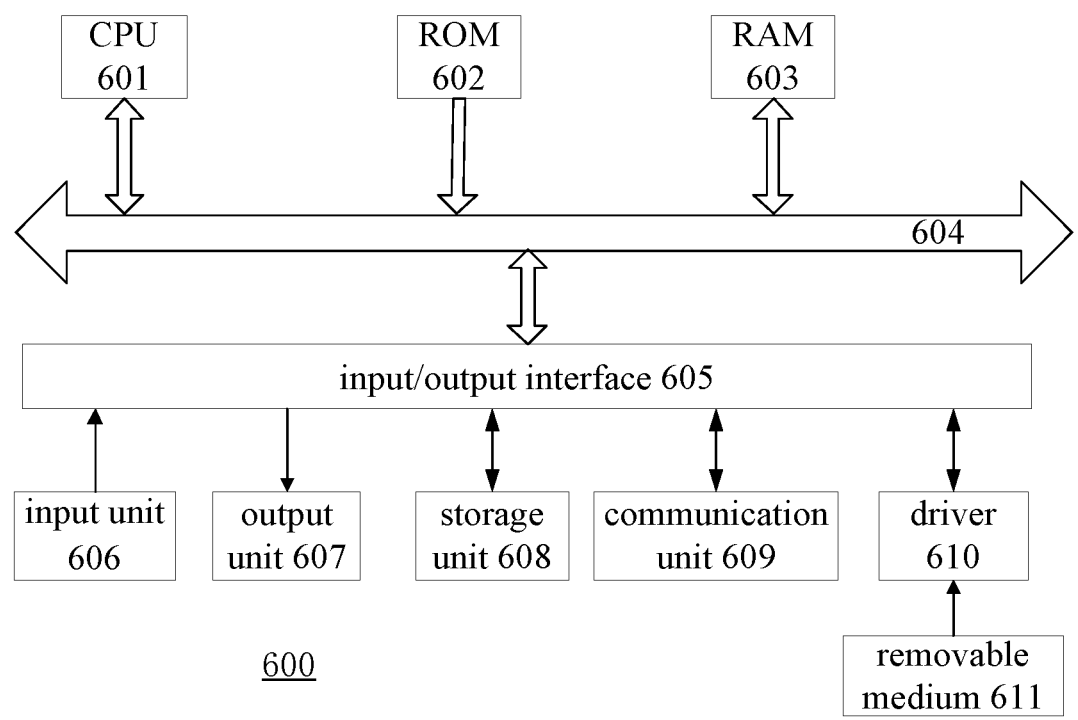
FIG. 6 shows a schematic block diagram of configuration of computer hardware.

FIG. 6 is an exemplary block diagram showing configuration of computer hardware for implementing the solution of the present disclosure according to programs.

In a computer 600, a central processing unit (CPU) 601, a read-only memory (ROM) 602 and a random-access memory (RAM) 603 are connected to one another via a bus 604.

An input/output interface 605 is also connected to the bus 604. The following components are connected to the input/output interface 605: an input unit 606 including keyboard, mouse, microphone and the like; an output unit 607 including display, speaker and the like; a storage unit 608 including hard disc, non-volatile memory and the like; a communication unit 609 including network interface card (such as local area network (LAN) card, and modem); and a driver 610 for driving a removable medium 611 which is for example magnetic disc, optical disc, magnetic optical disc or semiconductor memory.

In the computer with the above structure, the CPU 601 loads programs stored in the storage unit 608 into the RAM 603 via the input/output interface 605 and the bus 604, and executes the programs to perform the processes described above.

Programs to be executed by the computer (CPU 601) may be recorded on the removable medium 611 which is package medium. The package medium includes for example magnetic disc (including floppy), optical disc (including compact disc read-only memory (CD-ROM), digital versatile disc (DVD) and the like), magnetic optical disc or semiconductor memory. In addition, the programs to be executed by the computer (CPU 601) may be provided via wired or wireless transmission medium such as LAN, Internet or digital satellite broadcasting.

The programs may be loaded into the storage unit 608 via the input/output interface 605 in the case where the removable medium 611 is installed in the driver 610. Besides, the programs may be received by the communication unit 609 via wired or wireless transmission medium, and then installed in the storage unit 608. Alternatively, the programs may be installed in the ROM 602 or the storage unit 608 in advance.

The programs to be executed by the computer may be programs which execute the processes in the order described in the specification, or programs which execute the processes in parallel or when needed (for example, when the programs are invoked).

Herein, features, components, elements, operations and the like described in an embodiment is not limited to the embodiment, and may also be applied to another embodiment, for example, by replacing specific features, components, elements, operations and the like of the other embodiment or combining therewith.

The technical solutions and effects according to the present disclosure have been described above in detail in conjunction with the drawings, however the scope of the present disclosure is not limited thereto. It should be understood by those skilled in the art that, various modifications or changes may be made to the embodiments described herein depending on design requirement or other factor, without deviating from the principle and spirit of the present disclosure. The scope of the present disclosure is defined by the appended claims or equivalent thereof.

APPENDIX (1). An information processing method, comprising:
calculating at least one of a shape parameter and an expression parameter based on a correspondence relationship between a first set of landmarks in a two-dimensional (2D) image containing a face of a person and a second set of landmarks in an average three-dimensional (3D) face model; and
configuring a face deformable model using the at least one of the shape parameter and the expression parameter, to obtain a specific 3D model corresponding to the face contained in the 2D image.

(2). The information processing method according to (1), further comprising: configuring the face deformable model using the expression parameter which has been modified, to obtain a specific 3D model having another expression.

(3). The information processing method according to (1), further comprising: calculating the at least one of the shape parameter and the expression parameter based on the correspondence relationship between the first set of landmarks and the second set of landmarks in such a manner that a distance between each landmark in the first set of landmarks and the corresponding landmark in the second set of landmarks is minimized.

(4). The information processing method according to (1), wherein the face deformable model includes a shape feature and an expression feature,
wherein the configuring the face deformable model using the at least one of the shape parameter and the expression parameter comprises at least one of:
weighting the shape feature of the face deformable model by the shape parameter; and
weighting the expression feature of the face deformable model by the expression parameter.

(5). The information processing method according to (1), further comprising: calculating camera calibration parameters based on the correspondence relationship between the first set of landmarks and the second set of landmarks.

(6). The information processing method according to (5), further comprising: calculating the camera calibration parameters based on the correspondence relationship between the first set of landmarks and the second set of landmarks in such a manner that a distance between each landmark in the first set of landmarks and the corresponding landmark in the second set of landmarks is minimized.

(7). The information processing method according to (5), further comprising: configuring at least one of a posture and a scaling ratio of the specific 3D model using the camera calibration parameters, such that the specific 3D model corresponds to the face contained in the 2D image.

(8). The information processing method according to (7), further comprising: configuring the specific 3D model using the camera calibration parameters which have been modified, to obtain a specific 3D model having another posture or another scaling ratio.

(9). An information processing method, comprising:
calculating an average face model and a shape feature based on multiple first face models having neural expressions;
calculating an expression feature based on the multiple first face models and multiple second face models having non-neural expressions; and
constructing a face deformable model using the average face model, the shape feature and the expression feature.

(10). An information processing device, comprising a processing circuitry configured to implement the method according to any one of (1) to (9).

(11). A computer readable storage medium storing a program which, when being executed, causes a computer to implement the method according to any one of (1) to (9).

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing method, comprising:
calculating, by a processor, at least one of a shape parameter and an expression parameter based on a correspondence relationship between a first set of features in a two-dimensional (2D) image containing a face of a person and a second set of features in an average three-dimensional (3D) face model;
configuring, by the processor, a face deformable model using the at least one of the shape parameter and the expression parameter, to obtain a specific 3D model corresponding to the face contained in the 2D image; and
calculating, by the processor, camera calibration parameters based on the correspondence relationship between the first set of features and the second set of features in such a manner that a distance between each feature in the first set of features and a corresponding feature in the second set of features is minimized.

2. The information processing method according to claim 1, further comprising:
configuring, by the processor, the face deformable model using the expression parameter which has been modified, to obtain a specific 3D model having another expression.

3. The information processing method according to claim 1, further comprising:
calculating, by the processor, the at least one of the shape parameter and the expression parameter based on the correspondence relationship between the first set of features and the second set of features in such a manner that a distance between each feature in the first set of features and a corresponding feature in the second set of features is minimized.

4. The information processing method according to claim 1, wherein the face deformable model comprises a shape feature and an expression feature,
wherein the configuring of the face deformable model using the at least one of the shape parameter and the expression parameter comprises at least one of:
weighting, by the processor, the shape feature of the face deformable model by the shape parameter; and
weighting, by the processor, the expression feature of the face deformable model by the expression parameter.

5. The information processing method according to claim 1, further comprising:
configuring, by the processor, at least one of a posture and a scaling ratio of the specific 3D model using the camera calibration parameters, such that the specific 3D model corresponds to the face of the person contained in the 2D image.

6. The information processing method according to claim 5, further comprising:
configuring, by the processor, the specific 3D model using the camera calibration parameters which have been modified, to obtain a specific 3D model having another posture or another scaling ratio.

7. An information processing device, comprising a processor configured to implement the method according to claim 1.

* * * * *